(12) United States Patent
Codron

(10) Patent No.: US 11,221,105 B2
(45) Date of Patent: Jan. 11, 2022

(54) TANK FOR A HYDROGEN VEHICLE

(71) Applicant: IVECO FRANCE S.A.S., Venissieux (FR)

(72) Inventor: Stephane Codron, Lyons (FR)

(73) Assignee: IVECO FRANCE S.A.S., Venissieux (FR)

(*) Notice: Subject to any disclaimer, the term of this patent is extended or adjusted under 35 U.S.C. 154(b) by 216 days.

(21) Appl. No.: 16/711,143

(22) Filed: Dec. 11, 2019

(65) Prior Publication Data

US 2020/0191332 A1 Jun. 18, 2020

(30) Foreign Application Priority Data

Dec. 13, 2018 (IT) .................. 102018000011072

(51) Int. Cl.
*F17C 1/00* (2006.01)
*B60K 15/03* (2006.01)
*H01M 8/2465* (2016.01)

(52) U.S. Cl.
CPC .............. *F17C 1/005* (2013.01); *B60K 15/03* (2013.01); *H01M 8/2465* (2013.01); *B60K 2015/03315* (2013.01)

(58) Field of Classification Search
CPC .... F17C 1/005; F17C 2260/042; B60K 15/03; B60K 2015/03381; B60K 2015/03388; B60K 2015/03105; B60K 28/14; B60K 2015/03315; H01M 8/2465
See application file for complete search history.

(56) References Cited

U.S. PATENT DOCUMENTS

| 6,045,766 A | * | 4/2000 | Moser | C08J 7/126 423/240 R |
| 7,896,121 B2 | * | 3/2011 | Thompson | B60K 15/03 180/271 |
| 2012/0024197 A1 | * | 2/2012 | Lambertin | B01J 20/0233 106/694 |
| 2017/0016579 A1 | | 1/2017 | Pelger et al. | |

OTHER PUBLICATIONS

Italian Search Report and Written Opinion for Application No. IT 201800011072, dated Sep. 2, 2019, 7 pages.

* cited by examiner

*Primary Examiner* — Stephen J Castellano
(74) *Attorney, Agent, or Firm* — McCracken & Gillen LLC

(57) ABSTRACT

A tank for containing pressurized hydrogen for a fuel cell vehicle, comprising at least one fuel tank comprising a wall configured to delimit an internal volume for containing said pressurized hydrogen, said tank comprising safety means configured to chemically neutralize said pressurized hydrogen according to a pre-established condition.

17 Claims, 2 Drawing Sheets

TANK FOR A HYDROGEN VEHICLE

CROSS-REFERENCE TO RELATED APPLICATIONS

This patent application claims priority from Italian Patent Application No. 102018000011072 filed on Dec. 13, 2018, the entire disclosure of which is incorporated herein by reference.

STATEMENT RE: FEDERALLY SPONSORED RESEARCH/DEVELOPMENT

Not Applicable

TECHNICAL FIELD

This invention relates to an improved tank for a vehicle, particularly a tank improved in terms of safety to contain hydrogen for a fuel cell vehicle.

PRIOR ART

Road transport vehicles, such as public transport vehicles, increasingly use alternative energy sources to provide the vehicle's engine torque in order to avoid the use of polluting fuels, such as fossil fuels.

The use of fuel cells, for example hydrogen, is an example of these alternative energy sources. The fuel cell is usually powered by hydrogen under pressure at 300/800 bar, which is stored in tanks made of steel or composite material, transported by the vehicle.

However, it is known that hydrogen is an extremely volatile, light element, which reacts with the other elements of the atmosphere, primarily oxygen. In fact, when it is released into the environment hydrogen is considered an extremely flammable element.

In the event of an accident involving a vehicle with a pressurized hydrogen tank, a fire may develop, which could cause the hydrogen tank and, therefore, the entire vehicle to explode. This explosion is indeed extremely powerful. Suffice it to mention that a tank normally contains 2 kg of hydrogen which can develop an explosion capacity of 6 MJ.

In order to avoid such an explosion of the hydrogen tank, it is known to use valves allowing hydrogen to escape when the pressure inside the tank reaches a predetermined value, due to the high temperature that can be generated during a fire.

However, this hydrogen leak generates a persistent flame (20-30 seconds) and a considerable power that could seriously injure vehicle users or rescuers.

These conditions are more pronounced in less ventilated environments such as tunnels or car parks or in urban areas.

Therefore, there is a need to provide hydrogen tanks that can store a sufficient quantity of hydrogen for the vehicle use, which at the same time are safe in the event of an accident.

The invention therefore aims to solve the above-mentioned drawbacks in a cost-effective and optimized way.

SUMMARY OF THE INVENTION

The purposes mentioned above are achieved by a tank and a method according to the appended claims.

SHORT DESCRIPTION OF THE DRAWINGS

Other characteristics and advantages of the invention will emerge clearly from the description given below, provided by way of indication and without limitation, with reference to the annexed drawings, in which.

DETAILED DESCRIPTION OF THE INVENTION

Figure 1:
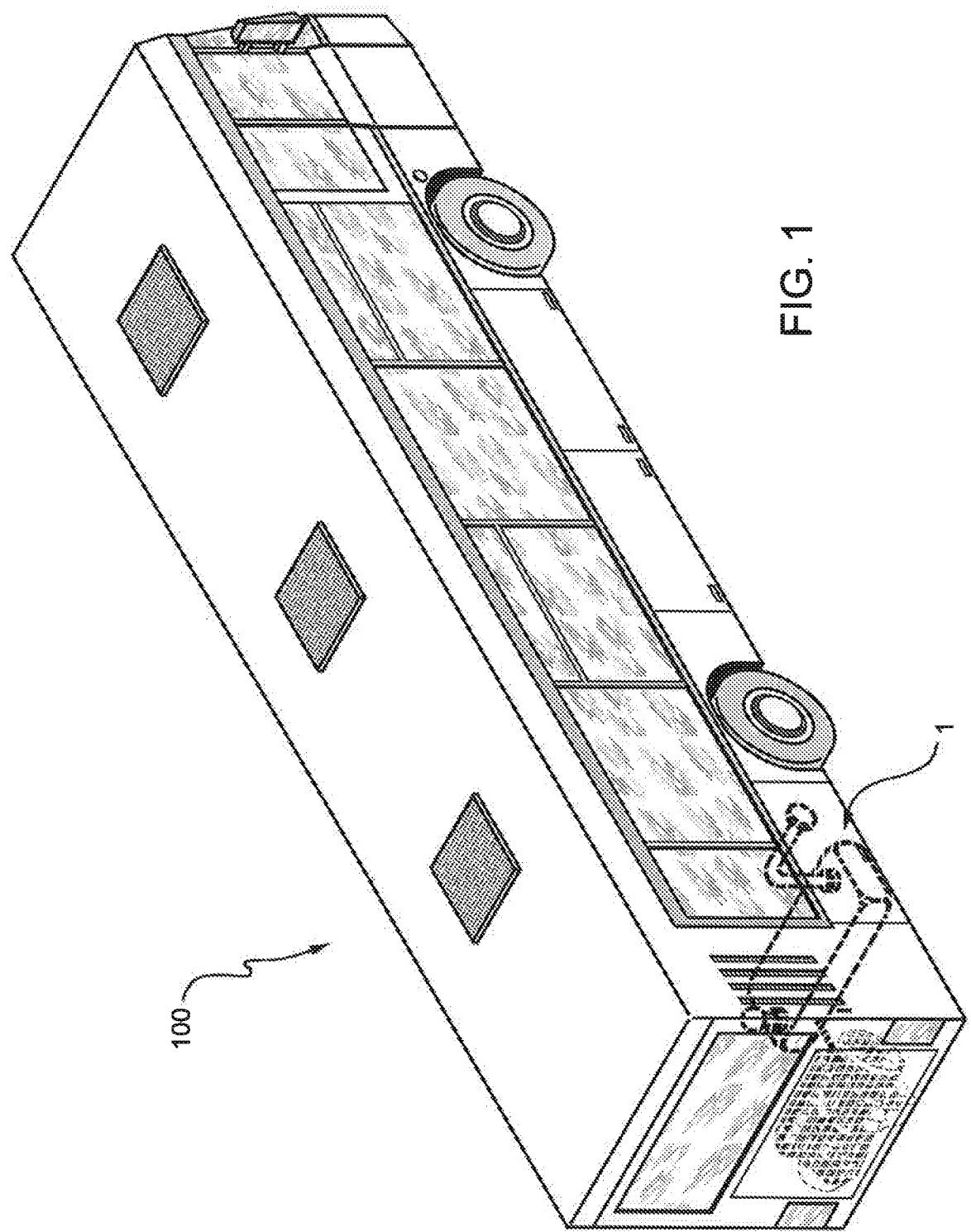
FIG. 1 is a perspective view of a public transport vehicle with a tank according to the invention.

FIG. 1 shows a public transport vehicle 100, for example a bus, comprising a fuel cell engine (not shown) and a tank 1, according to the invention, configured to contain pressurized hydrogen for a fuel cell vehicle.

Figures 2, 3, 4:
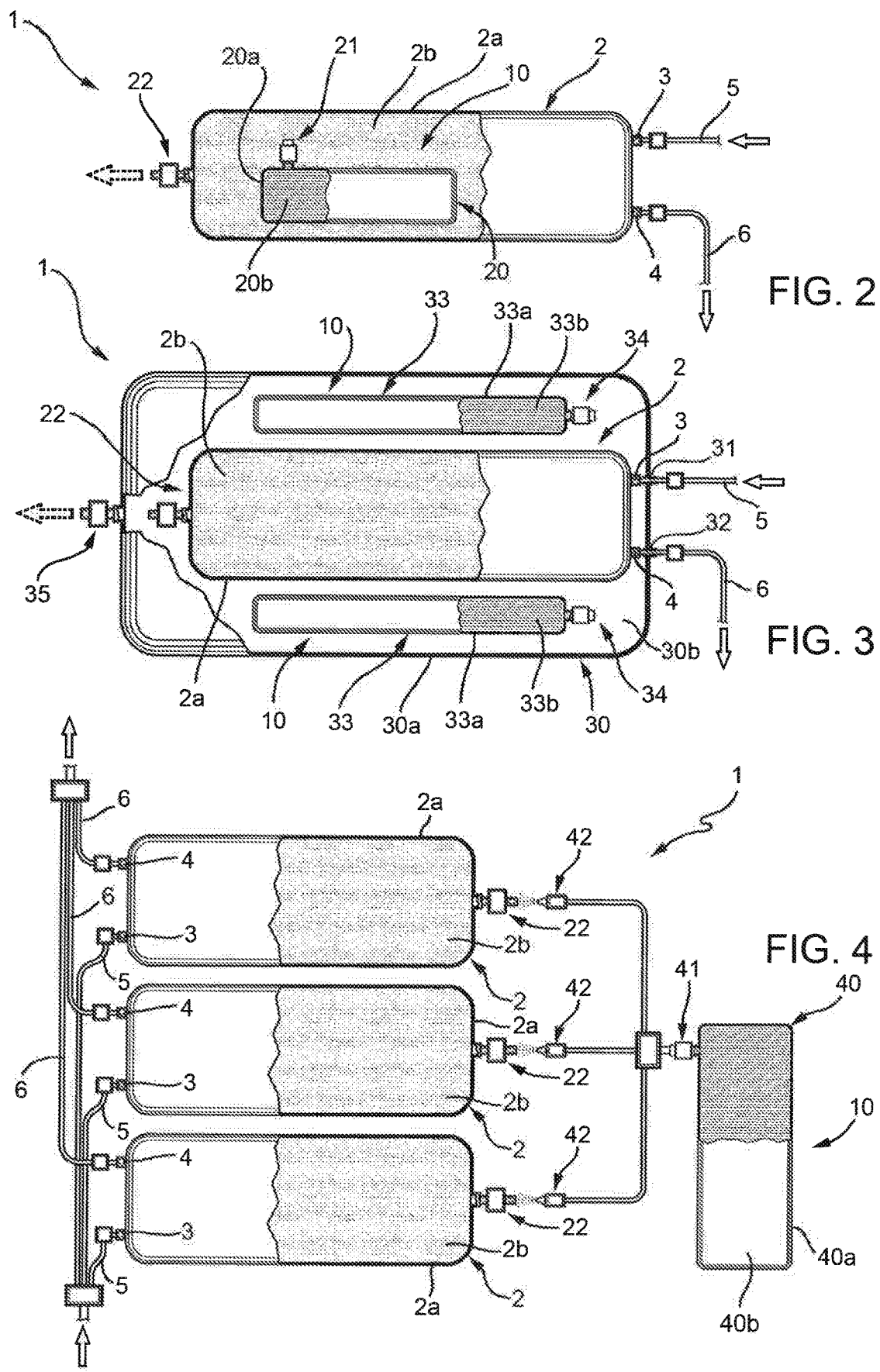
FIG. 2 is a schematic view—in which parts have been deleted for the sake of clarity—of a first embodiment of a tank according to the invention.
FIG. 3 is a schematic view—in which parts have been deleted for the sake of clarity—of a second embodiment of a tank according to the invention.
FIG. 4 is a schematic view—in which parts have been deleted for the sake of clarity—of a third embodiment of a tank according to the invention.

In any of the embodiments of the invention shown in FIGS. 2 to 4, the tank 1 comprises at least one fuel tank 2 comprising an outer wall 2a configured to delimit an inner volume 2b for containing pressurized hydrogen; as said, the outer wall 2a can be made of a metallic or composite material and is configured to maintain hydrogen in the internal volume 2b at a pressure between 300 and 800 bar.

The fuel tank 2 further comprises at least a first opening 3 and a second opening 4 passing through the outer wall 2a; the first opening 4 is fluidly connected to a first conduit 5 configured to allow the fuel tank 2 to be refilled and the second opening 5 is fluidly connected to a second conduit 6 configured to supply a fuel cell (not shown).

According to the invention, the tank 1 comprises safety means 10 configured to disperse a substance capable of chemically reacting with hydrogen to produce a neutral compound with regards to the combustion, under a pre-established condition.

This substance can be any substance configured to react with hydrogen to produce a neutral compound with regards to the combustion. Advantageously, this substance is configured to generate a spontaneous chemical reaction therewith at room temperature or at a predetermined temperature, for example in the event of fire.

This substance can be, for example, a metal oxide, preferably copper oxide, which is a material that can be easily preserved as a foam or fluid solution, is cheap and generates a spontaneous chemical reaction with hydrogen.

This spontaneous reaction is an exothermic reaction as described below:

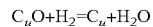

$$C_uO + H_2 = C_u + H_2O$$

in which copper oxide is transformed into pure copper and water.

The above-mentioned pre-established condition may be the temperature and/or pressure of hydrogen in the internal volume 2b or the air temperature of the area surrounding the fuel tank 2 or a vehicle deceleration value indicating a collision.

The above-mentioned physical quantities can be measured by means of sensors (not shown) configured to communicate electrically with an electronic control unit (not shown) of the vehicle 100, for example the ECU of the vehicle 100. The electronic unit can actively control the dispersion of the neutralizing substance by the safety means 10, when the sensors detect the pre-established condition mentioned above, for example through a closed loop control, preferably through the control method described below.

In a first embodiment of the tank 1, shown in FIG. 2, the latter comprises a single fuel tank 2 and the safety means 10 comprise at least one safety tank 20 placed inside the internal volume 2b, preferably fixed to the wall 2a by support means (not shown) and spaced from said wall. The safety tank 20 comprises an outer wall 20a delimiting an inner volume 20b configured to contain a fluid solution of a neutralizing substance of the type described above, preferably under pressure.

In order to deliver the neutralizing substance, the safety tank 20 comprises valve means 21 configured to allow fluid communication between the internal volume 20b of the safety tank 20 and the volume 2b of the fuel tank 2 through the wall 20a depending on the above-mentioned pre-established condition.

For example, the valve means 21 may comprise a relief valve controlled by the pressure of the neutralizing substance solution inside the safety tank 20 or by the temperature of the hydrogen, or electronically controlled by the electronic unit mentioned above based on a sensor detection.

Depending on the embodiment described above, the safety tank 20 may also comprise other means such as the valve 22 configured to allow ventilation of the fuel tank 2, when the valve means 21 of the safety tank 20 have been activated and, therefore, the above-mentioned chemical reaction is in progress. Said valve means 22, like the valve means 21, can be activated depending on the pressure and/or temperature as described above and/or electrically by means of the above-mentioned electronic unit, thus avoiding an increase in pressure inside the fuel tank 2.

The operation of the first embodiment of the tank 1 described above is as follows.

When the pre-established condition is reached, the valve means 21 open (actively controlled by the electronic unit or passively depending on the hydrogen pressure/temperature, for example) allowing the neutralizing substance to disperse inside in the volume 2b. Here, hydrogen reacts chemically with the neutralizing substance, generating a neutral compound and, for example, producing heat. Simultaneously with the opening of the valve means 21 or when the internal pressure of internal volume 2b reaches a pre-set value, the valve means 22 open allowing the neutral compound to disperse into the environment in order to prevent an overpressure in the internal volume 2b.

In a second embodiment of the tank 1, shown in FIG. 3, the latter comprises an external tank 30 with an outer wall 30a defining an intermediate volume 30b in which the fuel tank 2 is placed. The external tank 30 comprises at least one pair of openings 31, 32 configured to allow the passage of pipes 5, 6 from the fuel tank 2 through the wall 30a.

The safety means 10 comprise at least one safety tank 33 placed inside the intermediate volume 30b and comprising an outer wall 33a delimiting an inner volume 33b configured to contain a neutralizing substance solution in a way similar to the safety tank 20. In the example herein, the tank 30 comprises two safety tanks 33.

Similarly to the first embodiment, the safety tank 33 and the fuel tank 2 each comprise valve means 22, 34 configured to allow fluid communication between the internal volume 2b of the fuel tank 2 and the intermediate volume 30b of the tank 30 through the wall 33a and between the internal volume 33b of the safety tank 33 and the intermediate volume 30b of the tank 30 through the wall 33a, respectively. The valve means 22, 34 can comprise the same types of valves and controls described for the first embodiment.

The external tank 30 also comprises valve means 35 configured to allow fluid communication between the internal volume 30b and the environment so as to allow ventilation of the external tank 30, when the valve means 22, 34 have been activated and, therefore, the above-mentioned chemical reaction is in progress. The valve means 35 can include the same types of valves and controls described for the first embodiment.

The operation of the second embodiment of the tank 1 described above is as follows.

When the pre-established condition is reached, the valve means 34 open (actively controlled by the electronic unit or passively depending on the hydrogen pressure/temperature, for example) allowing the neutralizing substance to disperse inside the internal volume 33b. Simultaneously with the opening of the valve means 21, the valve means 22 open allowing hydrogen to disperse in the intermediate volume 33b. Here, hydrogen reacts chemically with the neutralizing substance, generating a neutral compound and, for example, producing heat. Simultaneously with the opening of the valve means 21, 22 or when the internal pressure of the intermediate volume 33b reaches a pre-set value, the valve means 35 open allowing the neutral compound to disperse in the environment to prevent an overpressure in the intermediate volume 33b.

In a third embodiment of the tank 1, shown in FIG. 4, the latter comprises several tanks 2 placed fluidly in parallel, for example three tanks 2.

The safety means 10 comprise at least one safety tank 40 placed outside the tanks 2 and comprising an outer wall 40a delimiting an internal volume 40b configured to contain a neutralizing substance solution in a way similar to the safety tanks 20, 33. In the example above, the tank 40 comprises only one safety tank 40.

In a similar way to the first and second embodiments, each fuel tank 2 comprises the valve means 22 configured to allow fluid communication between the internal volume 2b of the fuel tank 2 and the environment, respectively. The valve means 22 can include the same types of valves and controls described for the first embodiment.

The safety tank 40 comprises valve means 41 configured to allow fluid communication between the internal volume 40b and nebulization means 42, fluidly connected to the valve means 41, configured to direct the neutralizing substance to the valve means 22 of the fuel tanks 2.

The operation of the third embodiment described above is as follows.

When the pre-established condition is reached, the valve means 41 open (actively controlled by the electronic unit or passively depending on the hydrogen pressure/temperature, for example) allowing the neutralizing substance to disperse to the valve means 22 through the nebulization means 42. Simultaneously with the opening of the valve means 41, the valve means 22 open allowing hydrogen to be dispersed in the environment. Here, hydrogen reacts chemically with the neutralizing substance, generating a neutral compound and, for example, producing heat; the neutral substance is dispersed directly into the environment.

The invention also concerns a method to control a tank 1 configured to contain hydrogen under pressure to supply a fuel cell vehicle, for example according to the embodiment examples described above.

This control method essentially comprises the following steps:

reaching a pre-set condition that concerns an accident of said vehicle 100; and dispersing a substance that chemically reacts with the hydrogen contained in the tank 1 to form a neutral compound with respect to the combustion.

As described, dispersion can occur inside or outside the fuel tank 2, in a closed volume or in the environment.

As described, dispersion can be achieved by the safety means 10 that allow active or passive dispersion.

From the above, the advantages of a vehicle 100 comprising a tank 1 according to the present invention are obvious.

Thanks to the safety means 10, hydrogen is chemically neutralized and, therefore, its explosion is avoided.

In addition, when specific elements such as copper are chosen, the resulting compound does not increase the power of a possible fire.

In addition, copper oxide can be produced and dissolved in a neutral solution in a simple and economical way.

The different embodiments of the tank 1 and the proposed safety means 10 allow the safety means 10 to be used for any size and/or arrangement of the fuel tank 2.

Finally, it is clear that the vehicle 100 comprising a fuel tank 2 according to the present invention may be subject to modifications and variants which, however, do not fall outside the scope of protection defined by the claims.

The embodiments of the tank 1 described above could be combined with each other.

Again, the number, shape and type of fuel tanks 2 can vary, as well as, in a similar way, the type and number of valve means.

Copper oxide could be substituted by other chemical elements having similar properties.

What is claimed is:

1. A tank for containing pressurized hydrogen for a fuel cell vehicle, said tank comprising at least one fuel tank comprising a fuel tank wall configured to delimit an internal volume for containing said pressurized hydrogen, said tank comprising safety means configured to chemically neutralize said pressurized hydrogen according to a pre-established condition.

2. The tank according to claim 1, wherein said condition is related to the pressure and/or the temperature of said hydrogen in said internal volume or the temperature surrounding said fuel tank.

3. The tank according to claim 1, wherein said safety means are configured to release a substance provided for chemically reacting with said pressurized hydrogen for producing a neutral compound with regards to the combustion.

4. The tank according to claim 3, wherein said substance is an oxide.

5. The tank according to claim 3, wherein said substance is a metal oxide.

6. The tank according to claim 3, wherein said substance is a copper oxide.

7. The tank according to claim 3, wherein said substance is dispersed in a fluid.

8. The tank according to claim 3, wherein said substance is dispersed in a foam.

9. The tank according to claim 1, wherein said safety means comprise a safety tank comprising a safety tank wall configured to delimit an internal volume to contain a substance, said safety tank comprising valve means configured to release said substance to the outside of said safety tank wall according to said condition.

10. The tank according to claim 9, wherein said safety tank is positioned inside the internal volume of said fuel tank.

11. The tank according to claim 10, wherein said fuel tank comprises valve means configured to allow the fluid communication between said internal volume of the fuel tank and a volume external to the fuel tank wall.

12. The tank according to claim 11, wherein said valve means of said safety tank comprise nebulization means configured to direct said substance onto the valve means of said fuel tank.

13. The tank according to claim 10, comprising an external tank comprising an external tank wall that defines an intermediate volume in which said fuel tank and said safety tank are positioned.

14. The tank according to claim 13, wherein said external tank comprises valve means configured to allow the fluid communication between said intermediate volume and the environment.

15. The tank according to claim 9, wherein said safety tank is positioned outside the internal volume of said fuel tank.

16. A fuel cell vehicle comprising a tank according to claim 1.

17. A method to secure a tank for containing pressurized hydrogen according to claim 1 comprising the following steps: reaching a pre-set condition that concerns an accident of said vehicle; and dispersing a substance that chemically reacts with the hydrogen contained in said tank for forming a combustion-neutral compound.

* * * * *